UNITED STATES PATENT OFFICE.

ENGELBERT BERGS, OF LUDWIGSHAFEN-ON-THE-RHINE, GERMANY, ASSIGNOR TO BADISCHE ANILIN & SODA FABRIK, OF LUDWIGSHAFEN-ON-THE-RHINE, GERMANY, A CORPORATION.

PRODUCING UNSATURATED TERPENE HYDROCARBONS.

1,091,276.  Specification of Letters Patent.  Patented Mar. 24, 1914.

No Drawing.   Application filed December 9, 1911.   Serial No. 664,867.

*To all whom it may concern:*

Be it known that I, ENGELBERT BERGS, subject of the King of Prussia, residing at Ludwigshafen-on-the-Rhine, Germany, have invented new and useful Improvements in Producing Unsaturated Terpene Hydrocarbons, of which the following is a specification.

I have found that unsaturated hydrocarbons of the terpene series can be obtained with great ease by treating terpin, or terpin hydrate, or a terpineol, with neutral or alkaline substances which are capable of splitting off water. Such neutral or alkaline substances are included under the term "substance which is free from acid reaction." The initial materials can be heated either directly in an oil-bath with the catalytic agent, or be passed, in the form of vapor, over the catalytic agent (which is contained, for instance, in a tube), in which case it is sometimes preferable to employ the vapors in a state of dilution, which can be effected either by the addition of an indifferent gas, such for example as nitrogen, or by reducing the pressure under which the reaction takes place.

The process of this invention is especially valuable for the production of dipentene. For the purposes of this invention, terpin hydrate and terpineol are equivalent to terpin.

The following are examples of how my invention can be carried into practical effect, but the invention is not confined to these examples. The parts are by weight.

Example 1: Pass vapors of terpineol, of a boiling point of 218° C. and a melting point of 35° C., under reduced pressure, through a tube containing alumina and heated to about 250° C., and collect, in a suitable vessel, the vapors which leave the tube. The oily layer of the distillate consists chiefly of dipentene, and is separated from the water, dried, and fractionally distilled. Instead of terpineol, terpin, or terpin hydrate, can be employed. When terpin hydrate is employed, it is preferred, before using it, to free it as far as possible from water. Further, instead of employing alumina at 250° C., thorium oxid, or tungsten oxid, at 200° C. may be used.

Example 2: Pass terpineol vapor, diluted with nitrogen, over alumina at about 250° C., while employing ordinary pressure, then condense the vapors and work them up in any suitable manner.

Example 3: Pass terpineol vapor over alumina contained in a tube and heated to about 230° C., and condense the resulting vapors and work them up in any suitable manner.

Example 4: Allow terpin, which has been obtained by heating terpin hydrate, to drop on to alumina heated to from 250-280° C., while employing a vacuum, and then pass the produced vapors over a layer of alumina heated to about 200° C. The vapors can be condensed and worked up in any suitable manner.

In the foregoing examples, the alumina can be replaced by thorium oxid, or by tungsten dioxid.

Now what I claim is:—

1. The process of producing unsaturated hydrocarbons of the terpene series by heating terpin with a substance which is free from acid reaction which is capable of splitting off water.

2. The process of producing unsaturated hydrocarbons of the terpene series by passing terpin vapor over heated alumina.

3. The process of producing unsaturated hydrocarbons of the terpene series by passing terpin, under reduced pressure, over heated alumina.

4. The process of producing unsaturated hydrocarbons of the terpene series by passing terpin, under reduced pressure, over heated alumina at a temperature of about 250° C.

In testimony whereof I have hereunto set my hand in the presence of two subscribing witnesses.

ENGELBERT BERGS.

Witnesses:
J. ALEC. LLOYD,
A. O. TITTMANN.